US007738792B2

(12) United States Patent
Flachs et al.

(10) Patent No.: US 7,738,792 B2
(45) Date of Patent: Jun. 15, 2010

(54) MULTI-PROTOCOL INFRARED RECEIVER

(75) Inventors: Victor Flachs, Rishon Lezion (IL); Nimrod Peled, Tel Aviv (IL); Yan Nosovitsky, Hod Hasharon (IL)

(73) Assignee: Winbond Electronics Corporation, Hsinchu (TW)

( * ) Notice: Subject to any disclaimer, the term of this patent is extended or adjusted under 35 U.S.C. 154(b) by 551 days.

(21) Appl. No.: 11/880,981

(22) Filed: Jul. 24, 2007

(65) Prior Publication Data

US 2009/0028568 A1 Jan. 29, 2009

(51) Int. Cl.
*H04B 10/00* (2006.01)

(52) U.S. Cl. .......................... 398/106

(58) Field of Classification Search .................. 398/106
See application file for complete search history.

(56) References Cited

U.S. PATENT DOCUMENTS 3,786,360 A 1/1974 Kawa
4,627,080 A 12/1986 Debus
5,297,186 A 3/1994 Dong
5,319,191 A 6/1994 Crimmins
5,448,596 A 9/1995 Ezran et al.
5,507,040 A 4/1996 Eaton et al.
5,684,830 A 11/1997 Ichikawa et al.
5,898,513 A 4/1999 Gist et al.
5,905,761 A 5/1999 Je et al.
5,917,631 A 6/1999 Shafer
6,407,840 B1 6/2002 Shien-Te et al.
6,430,358 B1 8/2002 Yuen et al.
6,496,549 B1 12/2002 Crawford
2004/0076153 A1 4/2004 Hallenbeck
2004/0153699 A1 8/2004 Goldsmith et al.
2004/0208182 A1 10/2004 Boles et al.

FOREIGN PATENT DOCUMENTS

JP 2002232495 8/2002

OTHER PUBLICATIONS

National Semiconductor Corporation, "PC87364: 128-Pin LPC SuperI/O with Extended Wake-Up and Protection Support", Revision 2.0., Jul. 2000.

SMSC, "SIO1000: Super I/O with LPC Interface with FIR and Consumer IR Support", Product Review, Revision, Nov. 10, 2004.

SMSC, "USB2231/USB2232: 5th Generation Hi-Speed USB Flash Media and CIR Controller with Integrated Card Power FETs", Data sheet, Revision 1.3, Jul. 12, 2005.

SMSC, "FDC37B78x: Super I/O Controller with ACPI Support, Real Time Clock and Consumer IR", Revision Apr. 14, 2005.

SMSC, "LPC47N252: Advanced Notebook I/O Controller with On-Board Flash", Revision Sep. 6, 2000.

(Continued)

*Primary Examiner*—Shi K Li
(74) *Attorney, Agent, or Firm*—D. Kligler J.P. Services Ltd.

(57) ABSTRACT

A receiver includes a single infrared (IR) sensor, which is coupled to sense an IR signal carrying data and to produce an electrical signal responsively to the IR signal. The receiver further includes multiple receiver channels arranged to accept the electrical signal from the single IR sensor, each receiver channel configured to process the electrical signal in accordance with a different, respective IR remote control protocol so as to extract the data, and to output the extracted data to a host system.

22 Claims, 2 Drawing Sheets

OTHER PUBLICATIONS

SMSC, "IrCC2.0: Infrared Communications Controller", Revision Aug. 26, 1997.

SMSC:, "ClrCC: Consumer Infrared Communications Controller", Revision Dec. 8, 1997.

ITE Tech. Inc., "IT8705F/IT8705AF: Simple Low Pin Count Input/Output (Simple LPC I/O)", Preliminary Specification V0.4.1., year 2005.

Vishay, "TSOP321: IR Receiver Modules for Remote Control Systems", Document No. 82229, Revision 1.2., Jan. 31, 2005.

SB-Projects, "IR remote control: Philips RC-5 Protocol", 2001.

SB-Projects, "IR remote control: Philips RC-6 Protocol", 2005.

SB-Projects, "IR remote control: NEC protocol", 2001.

National Semiconductor Corporation, "DM74LS122 Retriggerable One-Shot with Clear and Complementary Outputs", May 1989.

National Semiconductor Corporation, "9601/DM9601 Retriggerable One Shot", Jun. 1989.

U.S. Appl. No. 11/517,126 Official Action dated Aug. 3, 2009.

MULTI-PROTOCOL INFRARED RECEIVER

FIELD OF THE INVENTION

The present invention relates generally to infrared remote control systems, and particularly to infrared receivers supporting multiple remote control protocols.

BACKGROUND OF THE INVENTION

Consumer electronic systems commonly use infrared (IR) remote control to receive input from a user. In such systems, the user operates a remote control device, which transmits a modulated IR signal that carries data in accordance with a certain IR remote control protocol. The data may comprise commands for controlling the system and/or other information. The controlled system comprises an IR receiver, which extracts the data from the IR signal in order to carry out the desired commands.

Many different IR remote control protocols have been developed, and different manufacturers often use different protocols and different data rates for transmission. Common protocols include the RC-5 and RC-6 protocols (developed by Philips) and the NEC protocol (developed by Nippon Electric Corporation). These protocols are collectively referred to as Commercial Infrared (CIR) protocols.

Some systems and applications support more than a single IR protocol. For example, U.S. Pat. No. 5,917,631, whose disclosure is incorporated herein by reference, describes dual-protocol remote control methods and apparatus, which provide power-saving modes of operation and enable remote control of high data generating devices, such as a trackball. The patent describes a pulse position modulation protocol in which the position of a single pulse, such as an infrared pulse, is located in time in one of three or more locations. Dual-protocol remote control devices may be provided, wherein a first protocol is utilized in conjunction with a second protocol comprising the pulse position modulated system.

U.S. Patent Application Publication 2004/0153699, whose disclosure is incorporated herein by reference, describes a system and method for supporting two infrared signaling protocols in a single computing device. The computing device operates in a default signaling protocol, unless a priority signaling request is generated by an application program. Typically, the signaling protocols comprise an Infrared Data Association (IrDA) protocol and a CIR protocol, which are generally incompatible and may cause interference to one another. The disclosed methods ensure that the two protocols do not operate at the same time.

SUMMARY OF THE INVENTION

Embodiments of the present invention provide a receiver, including:

a single infrared (IR) sensor, which is coupled to sense an IR signal carrying data and to produce an electrical signal responsively to the IR signal; and multiple receiver channels arranged to accept the electrical signal from the single IR sensor, each receiver channel configured to process the electrical signal in accordance with a different, respective IR remote control protocol so as to extract the data, and to output the extracted data to a host system.

In some embodiments, the host system has active and sleep operational states, and at least one of the receiver channels is arranged to issue a wake-up signal in order to switch the host system from the sleep operational state to the active operational state upon detecting that the electrical signal conforms to the respective IR remote control protocol. In a disclosed embodiment, at least two of the receiver channels are arranged to produce respective wake-up signals, and the receiver includes wake-up logic, which is arranged to process the wake-up signals, so as to issue a single composite wake-up signal to the host system. The wake-up logic may be arranged to output the composite wake-up signal to the host system over a single output pin.

In another embodiment, at least one of the receiver channels includes a run-length port circuit, which is arranged to format the data carried by the electrical signal in a run-length format and to output the data in the run-length format to the host system. In yet another embodiment, the host system has active and sleep operational states, the run-length port circuit is disabled when the host system is in the sleep operational state, and the at least one of the receiver channels further includes a wake-up port circuit, which is arranged to monitor the electrical signal and, when detecting that the electrical signal conforms to the respective IR remote control protocol, to activate the run-length port circuit.

In still another embodiment, at least one of the receiver channels includes a binary port circuit, which is arranged to decode the data carried by the electrical signal, to format the data in a binary format and to output the data in the binary format to the host system. In an embodiment, the host system has active and sleep operational states, and the binary port circuit is arranged to accept a binary bit sequence indicating a wake-up pattern, to decode the data carried by the electrical signal when the host system is in the sleep operational state, to compare the decoded data to the wake-up pattern and, when at least part of the data matches at least part of the wake-up pattern, to issue a wake-up signal in order to switch the host system from the sleep operational state to the active operational state. In a disclosed embodiment, the data carried by the electrical signal includes messages, and the binary port circuit is arranged to cache a message including the at least part of the data that matches the at least part of the wake-up pattern, and to provide the cached message to the host system. In some embodiments, the at least one of the receiver channels includes a port driver, which is arranged to configure the binary port circuit with the wake-up pattern before the host system switches to the sleep operational state.

In an embodiment, the receiver channels include at least one circuit selected from a group of circuit types consisting of host system interface circuitry, data processing circuitry and control circuitry, which is shared among at least two of the multiple receiver channels. In another embodiment, the IR remote control protocol includes a Commercial Infrared (CIR) protocol. The CIR protocol may include at least one protocol selected from a group of protocols consisting of an RC-5 protocol, an RC-6 protocol and a NEC protocol.

There is also provided, in accordance with an embodiment of the present invention, a method for reception, including:

sensing an infrared (IR) signal, which carries data, using a single IR sensor to produce an electrical signal responsively to the IR signal;

providing the electrical signal from the single IR sensor to multiple receiver channels, each channel corresponding to a different, respective IR remote control protocol;

in each of the receiver channels, processing the electrical signal in accordance with the respective IR remote control protocol so as to extract the data; and outputting the extracted data to a host system.

The present invention will be more fully understood from the following detailed description of the embodiments thereof, taken together with the drawings in which:

DETAILED DESCRIPTION OF EMBODIMENTS

Overview

Figure 1:
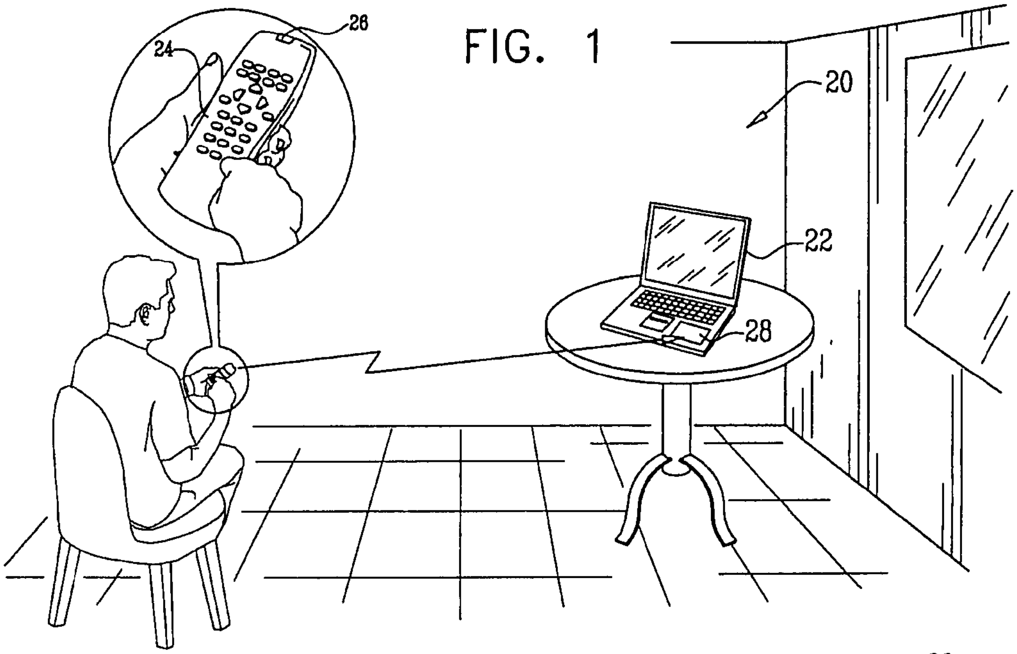
FIG. 1 is a schematic, pictorial illustration of a multimedia system with infrared (IR) remote control, in accordance with an embodiment of the present invention.

Embodiments of the present invention provide methods and systems for controlling a host system using multiple different IR remote control protocols. Supporting multiple IR protocols provides substantial operational and logistical advantages to both equipment manufacturers and users, as is explained and demonstrated below.

In the embodiments that are described hereinbelow, an IR receiver in the host system comprises a single IR sensor, which senses the IR signal transmitted to the receiver and produces an electrical signal in response to the IR signal. The receiver comprises two or more parallel receiver channels, which process the signal produced by the IR sensor. Each receiver channel is capable of receiving and decoding a particular CIR remote control protocol, such as an RC-5, RC-6 or NEC protocol. The host system receives the outputs of the different receiver channels and uses one of these outputs, in accordance with the protocol to which the received signal conforms.

Different host systems vary one from another in their operational states and the data formats they expect to receive from the IR receiver. Some host systems accept remote control data in Run-Length Encoding (RLE) format, while other systems request that data be provided in binary format, i.e., as a stream of bits corresponding to the bits carried by the IR signal. Moreover, many host systems alternate between active and sleep operational states, in order to reduce power consumption.

The IR receiver configurations described herein support these varying requirements and characteristics in a modular fashion. The receiver configurations use two possible types of port circuits, referred to as ports for brevity. A run-length port provides the data in run-length encoding format. A binary port circuit provides the data in binary form.

Since producing run-length data usually involves sampling the received signal at a high sampling rate, run-length port circuits tend to consume high amounts of power in comparison with binary/wake-up port circuits. Thus, receiver channels that produce run-length data are activated only when the host system is active, and are disabled when the host system is in sleep mode. Receiver channels that produce binary data may remain active irrespective of the operational state of the host system.

Typically, each receiver channel (which may comprise one or more ports) produces a wake-up signal when detecting that the received signal conforms to its respective protocol. In some embodiments, the receiver comprises wake-up logic, which processes the individual wake-up signals to produce a single composite wake-up signal that is provided to the host. This configuration reduces the number of Input/Output (I/O) pins between the receiver and the host system and relieves the host system of the task of handling multiple wake-up signals.

In some embodiments, the multiple receiver channels are implemented in a single hardware or firmware device, and some hardware or firmware circuitry is shared by the receiver channels rather than duplicated. Sharing circuitry among different receiver channels reduces the cost, size and power consumption of the receiver. Moreover, in some embodiments the host system can indicate the supported protocols to the receiver using a suitable interface, and the receiver can then configure its channels accordingly.

Unlike some known remote control methods in which the host system sets the desired protocol, in the methods and systems described herein the host system operates as a slave, and adapts itself to the protocol used by the remote control device that currently controls the system.

System Description

FIG. 1 is a schematic, pictorial illustration of a multimedia system 20 with infrared (IR) remote control, in accordance with an embodiment of the present invention. A user of system 20 controls a multimedia station 22, using an IR remote control device 24. The remote control device comprises an IR transmitter 26, which emits IR signals comprising a modulated train of IR pulses, in response to actuation of the controls by the user. An IR receiver 28 senses, demodulates, and decodes the IR signals in order to provide instructions to station 22 in accordance with the user's commands. Station 22 is referred to herein as a host system.

Although in the exemplary embodiment of FIG. 1 the host system comprises a multimedia station embodied in a mobile computer, the methods and systems described herein can be used to control a wide variety of host systems, such as television sets, set-top boxes, video recorders and players, various computers and computing platforms, electrical appliances such as air conditioners and refrigerators, as well as any other electrical or electronic system or appliance that may be remotely controlled or operated by a user.

Multi-Protocol IR Reception

In some applications, it is advantageous for the host system to support multiple IR remote control protocols, such as the RC-5, RC-6 or NEC CIR protocols mentioned above. Supporting multiple IR protocols provides substantial operational and logistical advantages to both equipment manufacturers and users.

For example, a manufacturer may wish to produce a single type of remotely-controlled system, such as a computer or television set, and sell it in different parts of the world that use different IR protocols. In another scenario, a manufacturer may wish to produce and sell a host system without selling or specifying a specific remote control device that must be used to control it. Alternatively, when a system is sold together with a matching remote control device, it is still advantageous to enable users to operate the system by other suitable remote control devices that they may possess.

As yet another example, a user may operate several host systems (e.g., laptop computer and set-top box) in proximity to one another, e.g., in the same room. The systems may be of different types and by different manufacturers. When the host systems support multiple IR remote control protocols, the user may operate all systems using the same remote control device, regardless of its protocol.

In view of the advantages described above, embodiments of the present invention provide methods and apparatus for controlling a host system using multiple different IR remote control protocols. In the embodiments that are described hereinbelow, an IR receiver in the host system comprises two or more receiver channels. Each receiver channel is capable of receiving and decoding a particular IR protocol. When receiving an IR signal from the remote control device, each receiver channel detects whether the signal conforms to its respective protocol.

In some cases, the receiver channel decodes the data carried by the signal and provides the data to the host system only if the IR signal conforms to the respective protocol. In other cases, the receiver channel may provide the data to the host system regardless of the protocol. When the signal does not match the protocol of the receiver, the data provided to the host may be meaningless. In these cases, the host determines which of the receiver channel outputs to use.

The IR receiver configuration may depend on the capabilities and requirements of the host system. For example, some host systems require that the decoded data be provided in binary format. Other host systems (such as the Windows Media Center of the Windows Vista™ operating system) require that the data be provided in raw, run-length encoding format.

In addition, the host system often has active and sleep operational states or modes. In the active state, the system is fully operational. In the sleep mode, most of the system functions are disabled in order to minimize its power consumption. In some embodiments, the receiver channels continue to operate when the system is in sleep mode. When a particular receiver channel detects an IR signal that conforms to its IR protocol, it issues a wake-up signal that causes the host system to switch to the active state.

Exemplary Multi-Protocol Receiver Configurations

Figure 2:
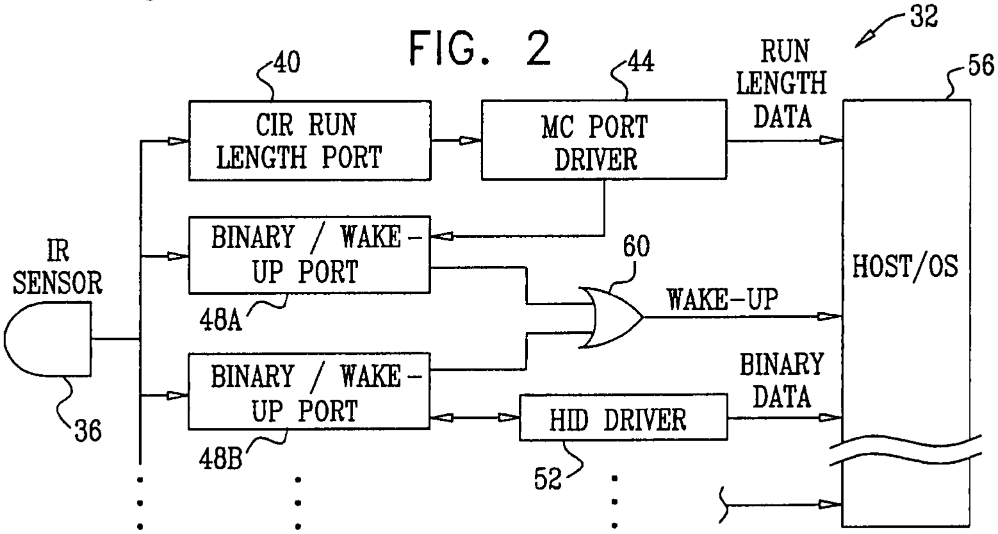
FIGS. 2 and 3 are block diagrams that schematically illustrate multi-protocol IR receivers, in accordance with embodiments of the present invention.
Figure 3:
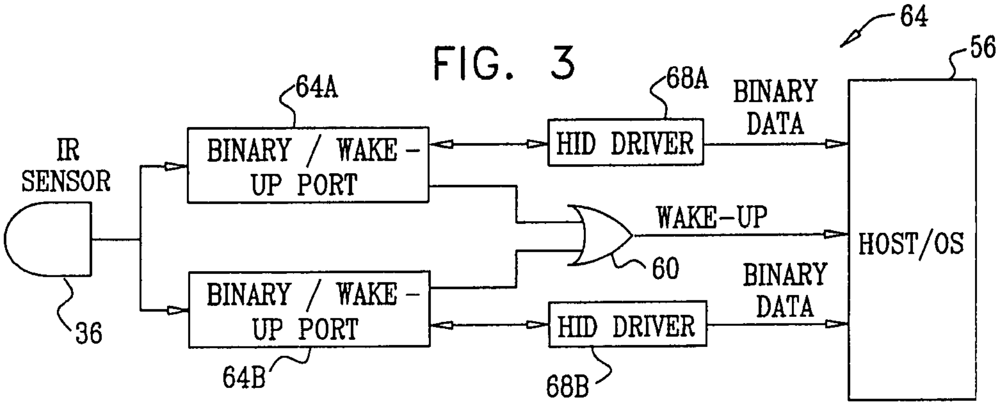

FIGS. 2 and 3 are block diagrams that schematically illustrate exemplary multi-protocol IR receivers, in accordance with embodiments of the present invention.

FIG. 2 shows a receiver 32, which comprises two receiver channels. The first receiver channel decodes a certain protocol, such as the RC-6 protocol, and produces run-length data. The second receiver channel decodes a different protocol, such as the NEC protocol, and produces binary data. Receiver 32 can be used, for example, with a host system such as Microsoft Media Center (MC), which requires that at least one protocol is provided in run-length format.

Receiver 32 comprises a single IR sensor 36, such as a photodiode. Sensor 36 senses the modulated IR signal transmitted from remote control device 24, and converts the IR signal to a corresponding electrical signal. The electrical signal is provided in parallel to the two receiver channels.

Receiver 32 comprises two different types of port circuits, which are used as building blocks of the receiver channels. The reason for using two different types of port circuits is that producing run-length data usually involves high power consumption, and is therefore only performed when the host system is in the active state. Producing binary data consumes less power, and may be performed both when the system is active and when it is in sleep mode.

The first port circuit type is a run-length port, which receives the electrical signal from sensor 36 and converts the signal into run-length data. The run-length port typically converts both data symbols and control symbols such as Leader, Gap and End symbols, as applicable in the protocol. In order to produce the data in run-length format, the run-length port over-samples the electrical signal at a high sampling rate. Producing high rate sampling clocks and sampling the electrical signal at high clock rates draws high levels of electrical power. Therefore, run-length ports are activated when the system is in the active state, and deactivated when the system is in sleep mode.

Typically, the run-length port sends run-length encoded data to the host regardless of whether or not the received signal conforms to the protocol assigned to the port. The host has the task of determining whether the data is meaningful or not and, if meaningful, to decode the run-length data. In some embodiments, the run-length port comprises a buffer, such as a First-In-First-Out (FIFO) memory, which buffers the run-length data and reduces the data-handling load of the host.

The second port circuit type is a wake-up/binary port, which receives the electrical signal from sensor 36, strips the control symbols (e.g., Leader, Gap and End), and converts it to binary data in accordance with the appropriate protocol. Unlike producing run-length data, binary data can be produced using low-frequency clock signals. Therefore, binary/wake-up ports can be kept active regardless of the operational state of the host system.

In addition to producing binary data, the binary/wake-up port produces a wake-up signal when it detects that a signal conforming to its protocol is received. Typically, the binary/wake-up port is programmed with a wake-up string, also referred to as a wake-up pattern. The wake-up string comprises a binary bit sequence, which is indicative of the protocol. When the host system is in sleep mode, the binary/wake-up port receives the electrical signal from sensor 36, extracts the data (CIR message, usually excluding the control symbols) from the signal and compares it with the wake-up string. If a match is found, i.e., if the received CIR message comprises a bit sequence that matches the wake-up string, the binary/wake-up port issues a wake-up signal in order to awaken the host system. In some embodiments, the binary/wake-up port issues the wake-up signal upon a partial match between the received data and the wake-up string. In some embodiments, the binary/wake-up port stores the received CIR message in a suitable message buffer and, once the host system is awakened, provides the CIR message that caused the wake-up to the host system.

In the example of FIG. 2, the first receiver channel (which produces run-length data) comprises a run-length port 40, a Windows Media Center (MC) port driver 44 and a binary/wake-up port 48A. The second receiver channel (which produces binary data) comprises a binary/wake-up port 48B similar to binary/wake-up port 48A, and a Human Interface Device (HID) driver 52, as is known in the art. The outputs of both receiver channels are provided to a host 56, which may comprise a processor and/or Operating System (OS) of the host system.

The operation of the first receiver channel differs between the active and sleep operational states. When the host system is active, run-length port 40 is active and binary/wake-up port 48A is inactive. Port 40 produces run-length data, which is forwarded by MC driver 44 to host 56. When the system is in sleep mode, run-length port 40 is deactivated in order to conserve power, and binary/wake-up port 48A is activated. When port 48A detects a signal that conforms to its protocol, it wakes up the host system. In particular, run-length port 40 is activated and normal operation is resumed. The process of alternating between the active and sleep modes is described in greater detail in FIG. 4 below.

The operation of the second receiver channel is similar in both operational states. Binary/wake-up port 48B receives the electrical signal from sensor 36. If the signal conforms to the appropriate protocol, port 48A decodes the data from the signal, formats it as binary data and forwards it to HID driver 52. The HID driver formats the binary data in HID report format and sends the data to host 56.

As noted above, each of binary/wake-up ports 48A and 48B produces a respective wake-up signal when it detects that a signal conforming to its protocol is received. Receiver 32 comprises wake-up logic 60, which processes the two wake-up signals to produce a single composite wake-up signal to the host. This configuration reduces the number of Input/Output (I/O) pins between the receiver and the host system, and relieves the host system of the task of handling multiple wake-up signals. In the present example, logic 60 performs a logical OR operation, thus issuing a composite wake-up signal when either individual wake-up signal is present. In alternative embodiments, logic 60 may perform any other suitable logic function.

FIG. 3 shows a receiver 64 having an alternative configuration. Receiver 64 comprises two receiver channels, which support two different IR remote control protocols, such as RC-6 and NEC. The first receiver channel comprises a binary/wake-up port 64A and a HID driver 68A, and the second receiver channel comprises a binary/wake-up port 64B and a HID driver 68B. In the present example, both receiver channels produce binary data. As in FIG. 2 above, the two channels produce respective individual wake-up signals, which are combined by logic 60 to produce a composite wake-up signal that is provided to host 56.

The receiver configurations of FIGS. 2 and 3 above are exemplary configurations, which were chosen purely for the sake of conceptual clarity. In alternative embodiments, the receiver may comprise any number of run-length ports and/or binary/wake-up ports, depending on the IR remote control protocols supported and the characteristics and requirements of the host system. The port circuits and drivers may have different functions and interfaces, depending of the protocols and on the requirements of host 56.

The run-length and binary/wake-up port circuits can be implemented using any suitable means. Exemplary port circuits are described in U.S. patent application Ser. No. 11/517,127, entitled "Low-Power Digital Demodulator," filed Sep. 6, 2006, and in U.S. patent application Ser. No. 11/517,126, entitled "Carrier Frequency-Independent Receiver," filed Sep. 6, 2006, whose disclosures are incorporated herein by reference.

Typically but not necessarily, the run-length ports, binary/wake-up ports and wake-up logic are implemented in hardware and/or firmware. The MC and HID drivers may be implemented in software on a processor of the host system and/or in suitable firmware. In some embodiments, such as when the host system comprises a personal computer or other computing platform, the port circuits, and possibly the drivers, are embodied in an Embedded Controller (EC) of the host system.

In a typical application, only one IR signal having a single protocol is received and processed by the receiver at any given time. When the ports of the different protocols are implemented in a single hardware or firmware device (and since most signal and protocol characteristics of the different CIR protocols are common or similar), some hardware or firmware circuitry can be shared by the different port circuits rather than duplicated. Such circuitry may comprise, for example, host interface circuitry, data processing circuitry and/or configuration and control circuitry. Sharing circuitry among different ports of different protocols reduces the cost, size and power consumption of the receiver. Moreover, in some embodiments the host system can indicate the supported protocols to the receiver using a suitable interface, and the receiver can then configure its ports accordingly.

Figure 4:
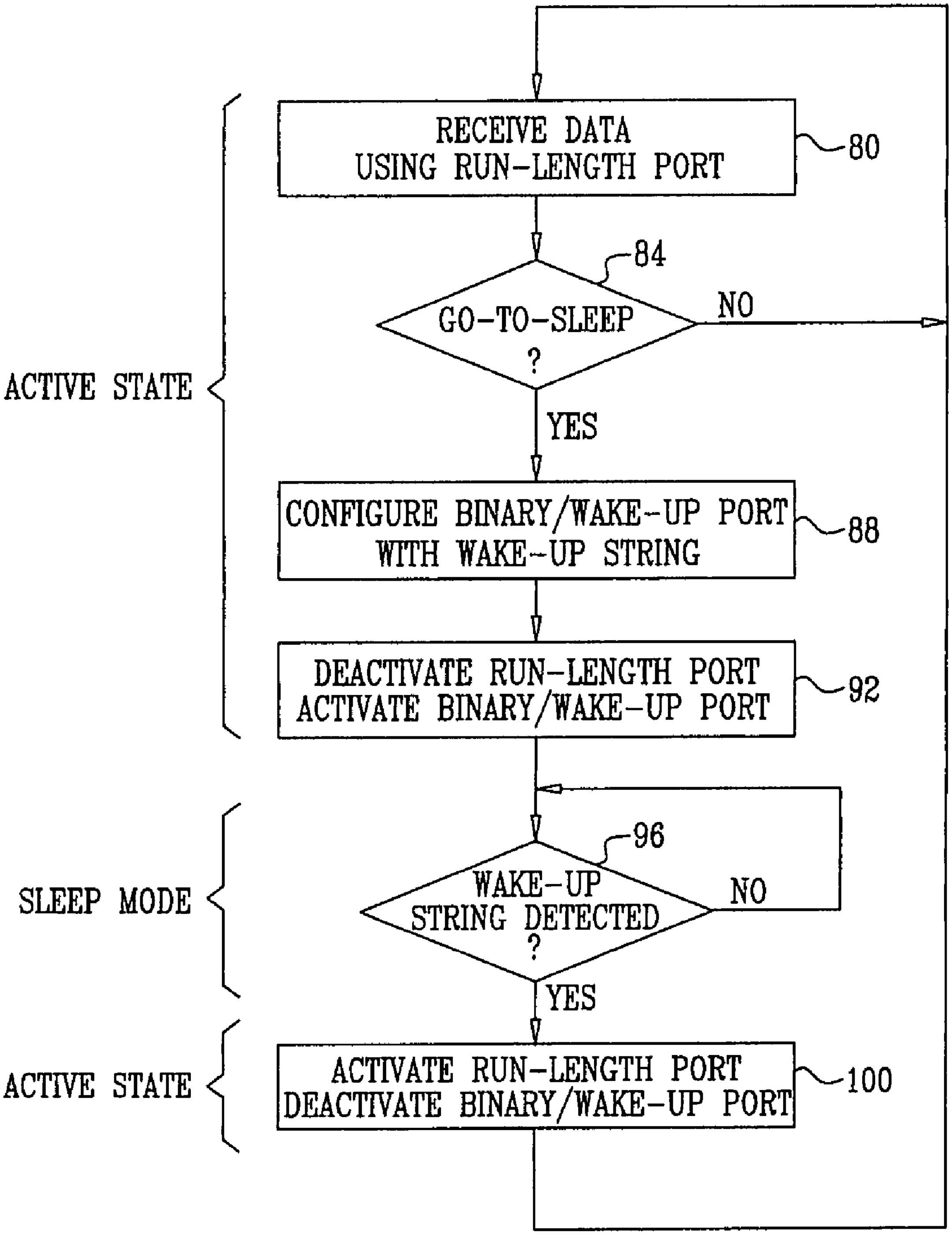
FIG. 4 is a flow chart that schematically illustrates a method for operating an IR receiver in a system having active and sleep operational states, in accordance with an embodiment of the present invention.

FIG. 4 is a flow chart that schematically illustrates a method for operating an IR receiver in a host system having active and sleep operational states, in accordance with an embodiment of the present invention. The description that follows refers to the operation of a receiver channel that produces run-length data, such as the first receiver channel in FIG. 2 above. The method can be used, however, in any other suitable receiver configuration.

The method begins with the host system operating in the active operational state. Thus, the run-length port receives the signal from the IR sensor and outputs data to the host system via the MC port driver, at an active operation step 80. Typically but not necessarily, the binary/wake-up port is deactivated at this state.

When the host system moves to sleep mode operation, as checked by a go-to-sleep checking step 84, the receiver channel changes its operation accordingly. The MC port driver configures the binary/wake-up port with a wake-up string that identifies the respective protocol, at a wake-up configuration step 88. The MC port driver then deactivates the run-length port and activates the binary/wake-up port, at a sleep mode transition step 92.

From this stage, the receiver channel operates in sleep mode, in which the run-length port is disabled. The binary/wake-up port continually attempts to match the received signal with the wake-up string, at a wake-up checking step 96. When a match is detected, the binary/wake-up port initiates a transition to the active state, at an active state transition step 100. The binary/wake-up port issues a wake-up signal to the host system and activates the run-length port. When transitioning to the active state, the binary/wake-up port is deactivated. The binary-wake-up port may deactivate itself or it may be deactivated by the MC port driver, which is now active. The method then loops back to active operation step 80 above, and the receiver channel begins to process the signal using the run-length port.

The method of FIG. 4 can also be used, mutatis mutandis, in receiver channels that produce binary data, such as the second receiver channel of FIG. 2 above or the receiver channels of FIG. 3 above. Before switching to sleep mode, the HID driver configures its respective binary/wake-up port with the appropriate wake-up string. During sleep mode operation, the binary/wake-up port continually compares the received data with the wake-up string and wakes the system up if a match (or partial match) is found. As noted above, in some embodiments the binary/wake-up port stores the decoded CIR message that caused the wake-up. The binary/wake-up port can provide the stored CIR message to the host system via the HID driver when the system is awakened.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A receiver, comprising:

a single infrared (IR) sensor, which is coupled to sense an IR signal carrying data and to produce an electrical signal responsively to the IR signal; and multiple receiver channels arranged to accept the electrical signal from the single IR sensor, each receiver channel configured to process the electrical signal in accordance with a different, respective IR remote control protocol so as to extract the data, and to output the extracted data to a host system;

wherein at least one of the receiver channels comprises a run-length port circuit, which is arranged to format the data carried by the electrical signal in a run-length format and to output the data in the run-length format to the host system; and wherein the host system has active and sleep operational states, wherein the run-length port circuit is disabled when the host system is in the sleep operational state, and wherein the at least one of the receiver channels further comprises a wake-up port circuit, which is arranged to monitor the electrical signal and, when detecting that the electrical signal conforms to the respective IR remote control protocol, to activate the run-length port circuit.

2. The receiver according to claim 1, wherein one or more of the receiver channels are arranged to issue a wake-up signal in order to switch the host system from the sleep operational state to the active operational state upon detecting that the electrical signal conforms to the respective IR remote control protocol.

3. The receiver according to claim 2, wherein at least two of the receiver channels are arranged to produce respective wake-up signals, and comprising wake-up logic, which is arranged to process the wake-up signals, so as to issue a single composite wake-up signal to the host system.

4. The receiver according to claim 3, wherein the wake-up logic is arranged to output the composite wake-up signal to the host system over a single output pin.

5. The receiver according to claim 1, wherein one or more of the receiver channels comprise a binary port circuit, which is arranged to decode the data carried by the electrical signal, to format the data in a binary format and to output the data in the binary format to the host system.

6. The receiver according to claim 5, wherein the binary port circuit is arranged to accept a binary bit sequence indicating a wake-up pattern, to decode the data carried by the electrical signal when the host system is in the sleep operational state, to compare the decoded data to the wake-up pattern and, when at least part of the data matches at least part of the wake-up pattern, to issue a wake-up signal in order to switch the host system from the sleep operational state to the active operational state.

7. The receiver according to claim 6, wherein the data carried by the electrical signal comprises messages, and wherein the binary port circuit is arranged to cache message comprising the at least part of the data that matches the at least part of the wake-up pattern, and to provide the cached message to the host system.

8. The receiver according to claim 6, wherein the one or more of the receiver channels comprise a port driver, which is arranged to configure the binary port circuit with the wake-up pattern before the host system switches to the sleep operational state.

9. The receiver according to claim 1, wherein the receiver channels comprise at least one circuit selected from a group of circuit types consisting of host system interface circuitry, data processing circuitry and control circuitry, which is shared among at least two of the multiple receiver channels.

10. The receiver according to claim 1, wherein the IR remote control protocol comprises a Commercial Infrared (CIR) protocol.

11. The receiver according to claim 10, wherein the CIR protocol comprises at least one protocol selected from a group of protocols consisting of an RC-5 protocol, an RC-6 protocol and a NEC protocol.

12. A method for reception, comprising:

sensing an infrared (IR) signal, which carries data, using a single IR sensor to produce an electrical signal responsively to the IR signal;

providing the electrical signal from the single IR sensor to multiple receiver channels, each channel corresponding to a different, respective IR remote control protocol;

in each of the receiver channels, processing the electrical signal in accordance with the respective IR remote control protocol so as to extract the data; and outputting the extracted data to a host system;

wherein processing the electrical signal comprises, in at least one of the receiver channels, formatting the data carried by the electrical signal in a run-length format and outputting the data in the run-length format to the host system; and wherein the host system has active and sleep operational states, and wherein formatting the data in the run-length format comprises suspending formatting the data in the run-length format when the host system is in the sleep operational state, monitoring the electrical signal, and resuming formatting the data in the run-length format upon detecting that the electrical signal conforms to the respective IR remote control protocol.

13. The method according to claim 12, wherein processing the electrical signal comprises issuing a wake-up signal by one or more of the receiver channels upon detecting that the electrical signal conforms to the respective IR remote control protocol, in order to switch the host system from the sleep operational state to the active operational state.

14. The method according to claim 13, wherein issuing the wake-up signal comprises producing at least two wake-up signals by respective at least two of the receiver channels, processing the wake-up signals to produce a single composite wake-up signal, and issuing the composite wake-up signal to the host system.

15. The method according to claim 14, wherein issuing the composite wake-up signal comprises outputting the composite wake-up signal to the host system over a single output pin.

16. The method according to claim 12, wherein processing the electrical signal comprises, in one or more of the receiver channels, decoding the data carried by the electrical signal, formatting the data in a binary format and outputting the data in the binary format to the host system.

17. The method according to claim 16, wherein decoding the data comprises accepting a binary bit sequence indicating a wake-up pattern, decoding the data carried by the electrical signal when the host system is in the sleep operational state, comparing the decoded data to the wake-up pattern and, when at least part of the data matches at least part of the wake-up pattern, issuing a wake-up signal in order to switch the host system from the sleep operational state to the active operational state.

18. The method according to claim 17, wherein the data carried by the electrical signal comprises messages, and wherein comparing the data to the wake-up pattern comprises cashing a message comprising the at least part of the data that matches the at least part of the wake-up pattern, and providing the cached message to the host system.

19. The method according to claim 17, wherein accepting the binary bit sequence comprises programming the wake-up pattern before the host system switches to the sleep operational state.

20. The method according to claim 12, wherein processing the electrical signal comprises sharing at least one circuit selected from a group of circuit types consisting of host system interface circuitry, data processing circuitry and control circuitry among at least two of the multiple receiver channels.

21. The method according to claim 12, wherein the IR remote control protocol comprises a Commercial Infrared (CIR) protocol.

22. The method according to claim 21, wherein the CIR protocol comprises at least one protocol selected from a group of protocols consisting of an RC-5 protocol, an RC-6 protocol and a NEC protocol.

* * * * *